United States Patent
Moribe et al.

(10) Patent No.: US 12,418,739 B2
(45) Date of Patent: Sep. 16, 2025

(54) CONTROL APPARATUS

(71) Applicant: NTT DOCOMO, INC., Chiyoda-ku (JP)

(72) Inventors: Tomoya Moribe, Chiyoda-ku (JP); Gou Yamanaka, Chiyoda-ku (JP); Makoto Takahashi, Chiyoda-ku (JP); Hisashi Matsuoka, Chiyoda-ku (JP); Yoshiki Okano, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 417 days.

(21) Appl. No.: 17/996,864

(22) PCT Filed: Apr. 23, 2021

(86) PCT No.: PCT/JP2021/016444
§ 371 (c)(1),
(2) Date: Oct. 21, 2022

(87) PCT Pub. No.: WO2021/241093
PCT Pub. Date: Dec. 2, 2021

(65) Prior Publication Data
US 2023/0146781 A1     May 11, 2023

(30) Foreign Application Priority Data
May 29, 2020   (JP) .................................. 2020-094832

(51) Int. Cl.
*H04Q 9/00*         (2006.01)
(52) U.S. Cl.
CPC ................ *H04Q 9/00* (2013.01); *Y02A 40/25* (2018.01)
(58) Field of Classification Search
CPC . H04Q 9/00; Y02A 40/25; A01G 9/22; A01G 9/246; A01G 9/241
See application file for complete search history.

(56) References Cited

U.S. PATENT DOCUMENTS

| | | | |
|---|---|---|---|
| 9,769,755 B2* | 9/2017 | Uchiyama | H04W 52/0219 |
| 10,186,134 B1* | 1/2019 | Moon | G08B 25/006 |

(Continued)

FOREIGN PATENT DOCUMENTS

| | | | |
|---|---|---|---|
| AU | 2003100531 A4 * | 9/2003 | ............... A01G 7/00 |
| JP | 2018-121556 A | 8/2018 | |

(Continued)

OTHER PUBLICATIONS

M. Azaza, C. Tanougast, E. Fabrizio, A. Mami, Smart greenhouse fuzzy logic based control system enhanced with wireless data monitoring, Dec. 31, 2015, 11 pages (Year: 2015).*

(Continued)

*Primary Examiner* — Yongjia Pan
(74) *Attorney, Agent, or Firm* — Oblon, McClelland, Maier &Neustadt, L.L.P.

(57) ABSTRACT

A control apparatus includes: a determiner configured to determine, for each indicator of a plurality of indicators, whether an event relevant to a change in the respective indicator has occurred, the plurality of indicators relating to an environment in which crops are grown, each indicator of the plurality of indicators being detected by one or more sensors of a plurality of sensors; an identifier configured to identify, based on a result of a determination executed by the determiner, a plurality of target sensors from among the plurality of sensors, a number of the plurality of target sensors being less than a number of the plurality of sensors; and a transmission instructor configured to instruct each target sensor of the plurality of target sensors to transmit a respective detection result.

11 Claims, 7 Drawing Sheets

(56) References Cited

U.S. PATENT DOCUMENTS

| | | | | |
|---|---|---|---|---|
| 10,509,378 | B2 * | 12/2019 | Jennings | B05B 12/12 |
| 10,789,789 | B1 * | 9/2020 | Edman | G01C 21/3407 |
| 2006/0176169 | A1 * | 8/2006 | Doolin | G08B 31/00 |
| | | | | 340/521 |
| 2007/0185660 | A1 * | 8/2007 | Anderson | G01D 21/00 |
| | | | | 702/41 |
| 2016/0202679 | A1 * | 7/2016 | Bermudez Rodriguez | |
| | | | | G05B 19/042 |
| | | | | 700/284 |
| 2018/0011460 | A1 * | 1/2018 | Barone | G01N 3/066 |
| 2019/0254242 | A1 * | 8/2019 | Allen | G06Q 10/04 |
| 2019/0331832 | A1 * | 10/2019 | Chandra | G01W 1/06 |
| 2019/0362027 | A1 * | 11/2019 | Jain | G06F 30/00 |
| 2020/0158578 | A1 * | 5/2020 | Trzecieski | G01K 1/14 |
| 2020/0184153 | A1 * | 6/2020 | Bongartz | A01G 9/249 |

FOREIGN PATENT DOCUMENTS

| | | | | |
|---|---|---|---|---|
| KR | 20120076691 A | * | 7/2012 | A01G 7/00 |
| WO | WO-2018107245 A1 | * | 6/2018 | A01G 25/167 |

OTHER PUBLICATIONS

International Search Report mailed on Jul. 20, 2021 in PCT/JP2021/016444 filed on Apr. 23, 2021.

\* cited by examiner

| | | | | | | | |
|---|---|---|---|---|---|---|---|
| OCCURRENCE OF TEMPERATURE RELEVANT EVENT | O | × | × | O | O | × | × |
| OCCURRENCE OF RAIN RELEVANT EVENT | × | O | × | O | × | O | × |
| OCCURRENCE OF HUMIDITY RELEVANT EVENT | × | × | O | × | O | O | × |
| TARGET SENSORS | TEMPERA-TURE SENSOR | RAIN SENSOR | HUMIDITY SENSOR | TEMPERA-TURE SENSOR, RAIN SENSOR | TEMPERA-TURE SENSOR, HUMIDITY SENSOR | RAIN SENSOR, HUMIDITY SENSOR | TEMPERA-TURE SENSOR, HUMIDITY SENSOR | NOT AVAILABLE |

CONTROL APPARATUS

TECHNICAL FIELD

The present invention relates to a control apparatus.

BACKGROUND ART

Patent Document 1 discloses a system for automatically controlling an irrigation apparatus configured to regulate water content of farmland. The system includes a plurality of sensors, a gateway, and a server. Each sensor detects the water content of the farmland. Each sensor transmits a respective detection result. The server receives the respective detection result from each sensor via the gateway. The server controls the irrigation apparatus based on the respective detection result from each sensor.

RELATED ART DOCUMENT

Patent Document

Patent Document 1: Japanese Patent Application Laid-Open Publication No. 2018-121556

SUMMARY OF THE INVENTION

Problem to be Solved by the Invention

In a system in which each sensor transmits a respective detection result, such as the system described in Patent Document 1, a detection result transmitted from one sensor may collide with a detection result transmitted from another sensor.

An object of the present invention is to provide a technique capable of reducing collisions between a detection result transmitted from one sensor and a detection result transmitted from another sensor.

Means for Solving the Problem

A control apparatus according to one aspect of the present invention includes: a determiner configured to determine, for each indicator of a plurality of indicators, whether an event relevant to a change in the respective indicator has occurred, the plurality of indicators relating to an environment in which crops are grown, each indicator of the plurality of indicators being detected by one or more sensors of a plurality of sensors; an identifier configured to identify, based on a result of a determination executed by the determiner, a plurality of target sensors from among the plurality of sensors, a number of target sensors being less than a number of sensors included in the plurality of sensors; and a transmission instructor configured to instruct each target sensor of the plurality of target sensors to transmit a respective detection result.

Effects of the Invention

According to one aspect of the present invention, it is possible to reduce collisions between a detection result transmitted from one sensor and a detection result transmitted from another sensor.

BRIEF DESCRIPTION OF THE DRAWINGS

FIG. 3 is a diagram showing a determination table 520a.

MODES FOR CARRYING OUT THE INVENTION

First Embodiment

A1: Environmental Management System 1000

Figure 1:
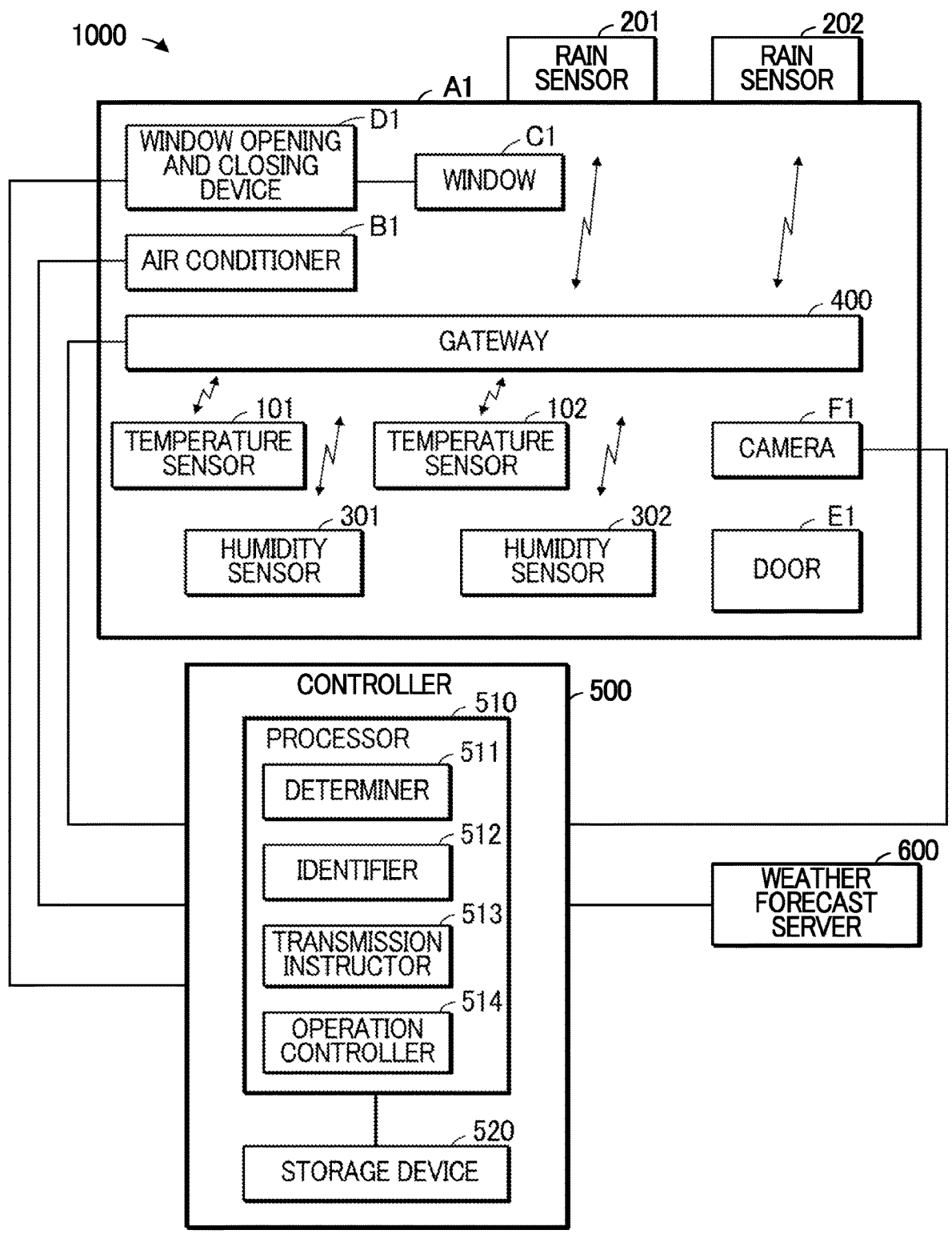
FIG. 1 is a diagram showing an environmental management system 1000.

FIG. 1 is a diagram showing an environmental management system 1000. The environmental management system 1000 regulates an environment (for example, the temperature and humidity) in an agricultural house A1 so as to be an environment suitable for growing crops.

The agricultural house A1 is used to grow crops. The crops are, for example, vegetables, fruits, or grains. At least part of the agricultural house A1 includes a portion through which light passes. The agricultural house A1 may not have a portion through which light passes. The agricultural house A1 includes an air conditioner B1, a window C1, a window opening and closing device D1, a door E1, and a camera F1.

The air conditioner B1 regulates the temperature of the air in the agricultural house A1 (hereinafter referred to as "temperature of the air"). The window C1 is located in a roof of the agricultural house A1. The window C1 may be located on a side wall of the agricultural house A1. The window C1 is used to regulate the humidity of the air in the agricultural house A1. The window opening and closing device D1 includes an actuator configured to open and close the window C1. The door E1 is used to allow people to enter and exit the agricultural house A1. The camera F1 captures the door E1 to generate image data. The image data indicates a state of whether the door E1 is open.

Opening the door E1 may result in a high probability of change in the temperature of the air in the agricultural house A1. Therefore, an event, in which the door E1 opens, is relevant to change in the temperature of the air. The image data indicative of the state of whether the door E1 is open is an example of event data relating to occurrence of an event (event in which the door E1 opens) relevant to change in the temperature of the air. The camera F1 is an example of a data generation device configured to generate the event data.

Opening the door E1 may result in a high probability of change in humidity in the agricultural house A1. Therefore, the event, in which the door E1 opens, is relevant to change in humidity. The image data indicative of the state of whether the door E1 is open is an example of event data relating to occurrence of an event (the event in which the door E1 opens) relevant to change in humidity.

The environmental management system 1000 includes temperature sensors 101 and 102, rain sensors 201 and 202, humidity sensors 301 and 302, a gateway 400, and a controller 500.

The temperature sensors 101 and 102 each detect the temperature of the air in the agricultural house A1. The temperature of the air has an effect on growth of crops. The temperature of the air is an example of a first indicator relating to an environment in which crops are grown. Instead of the two temperature sensors, one, three, or more temperature sensors may be used.

The rain sensors 201 and 202 each detect rain information relating to whether it is raining. The rain information represents, for example, precipitation. When rain enters the agricultural house A1 in a situation in which the window C1 is open, the rain has an effect on growth of the crops. The rain information is an example of a second indicator relating to the environment in which crops are grown. Instead of the two rain sensors, one, three, or more rain sensors may be used.

The humidity sensors 301 and 302 each measure the humidity of the air in the agricultural house A1. The humidity has an effect on growth of crops. The humidity is an example of a third indicator relating to the environment in which crops are grown. Instead of the two humidity sensors, one, three, or more humidity sensors may be used.

The temperature of the air and the humidity each indicate the environment within the agricultural house A1, in other words, the environment in which the crops are grown in the agricultural house A1.

The rain information indicates an external environment of the agricultural house A1. Consequently, when the window C1 of the agricultural house A1 is closed, the rain information does not significantly affect the environment in which the crops are grown in the agricultural house A1.

Therefore, the temperature of the air and the humidity each have a greater effect on growth of crops than the rain information.

The temperature of the air, the rain information, and the humidity are examples of a plurality of indicators. The temperature sensor 101, the temperature sensor 102, the rain sensor 201, the rain sensor 202, the humidity sensor 301, and the humidity sensor 302 constitute a group of a plurality of sensors. Each sensor of the plurality of sensors detects any of the plurality of indicators. Each indicator of the plurality of indicators is detected by at least one sensor of the plurality of sensors (one or more sensors of the plurality of sensors).

The gateway 400 wirelessly communicates with the temperature sensor 101, the temperature sensor 102, the rain sensor 201, the rain sensor 202, the humidity sensor 301, and the humidity sensor 302.

The controller 500 is configured to detect the environment of the agricultural house A1 by controlling the temperature sensor 101, the temperature sensor 102, the rain sensor 201, the rain sensor 202, the humidity sensor 301, and the humidity sensor 302 through the gateway 400.

The controller 500 controls the environment in the agricultural house A1 by controlling the air conditioner B1 and the window opening and closing device D1. The controller 500 controls the air conditioner B1 based on the detection result from at least one sensor from among the temperature sensors 101 and 102. For example, the controller 500 controls the air conditioner B1 based on a detection result from the temperature sensor 101 or based on a detection result from the temperature sensor 102. The controller 500 may control the air conditioner B1 based on both the detection result from the temperature sensor 101 and the detection result from the temperature sensor 102. The controller 500 controls the window opening and closing device D1 based on a detection result from at least one sensor from among sensors consisting of the rain sensor 201, the rain sensor 202, the humidity sensor 301, and the humidity sensor 302. For example, the controller 500 controls the window opening and closing device D1 based on a detection result from the rain sensor 201, based on the detection result from the rain sensor 202, based on the detection result from the humidity sensor 301, or based on the detection result from the humidity sensor 302. The controller 500 may control the window opening and closing device D1 based on the detection result from the rain sensor 201, based on the detection result from the rain sensor 202, based on the detection result from the humidity sensor 301, and based on the detection result from the humidity sensor 302. The controller 500 may control the window opening and closing device D1 based on two detection results from among four detection results having the detection result from the rain sensor 201, the detection result from the rain sensor 202, the detection result from the humidity sensor 301, and the detection result from the humidity sensor 302. The controller 500 may control the window opening and closing device D1 based on three detection results from among the four detection results having the detection result from the rain sensor 201, the detection result from the rain sensor 202, the detection result from the humidity sensor 301, and the detection result from the humidity sensor 302.

When the controller 500 receives detection results from the temperature sensor 101, the temperature sensor 102, the rain sensor 201, the rain sensor 202, the humidity sensor 301, and the humidity sensor 302 via the gateway 400 simultaneously or substantially simultaneously, the detection results may collide with each other.

Therefore, the controller 500 identifies sensors, which are to detect a necessary indicator, from among the sensors consisting of the temperature sensor 101, the temperature sensor 102, the rain sensor 201, the rain sensor 202, the humidity sensor 301, and the humidity sensor 302, as target sensors.

The necessary indicator is an indicator with a high probability of undergoing a change. The indicator (each of the temperature, the rain information, and the humidity) has an effect on growth of crops. To regulate the environment in the agricultural house A1 so as to be an environment suitable for growth of crops, the controller 500 regulates both an operation of the air conditioner B1 and an operation of the window opening and closing device D1 in accordance with a change in the indicator. Therefore, the indicator with the high probability of undergoing the change is an important indicator for controlling the air conditioner B1 and for controlling the window opening and closing device D1, in other words, the necessary indicator.

The controller 500 identifies sensors that are to detect the indicator with the high probability of undergoing the change, in other words, the target sensors, based on both the image data and weather forecast information.

The controller 500 receives the image data from the camera F1. The image data indicates the state of whether the door E1 is open. The state of whether the door E1 is open affects both change in temperature and change in humidity in the agricultural house A1. The controller 500 determines whether to identify the temperature sensor 101, the temperature sensor 102, the humidity sensor 301, and the humidity sensor 302 as the target sensors, based on the image data indicative of the state of whether the door E1 is open.

The controller 500 receives the weather forecast information indicative of a weather forecast from a weather forecast server 600. The weather forecast affects, in the agricultural house A1, change in temperature, change in humidity, and change in whether it is raining. For each of the temperature sensor 101, the temperature sensor 102, the rain sensor 201, the rain sensor 202, the humidity sensor 301, and the humidity sensor 302, the controller 500 determines whether to identify, the respective sensor as a target sensor, based on the weather forecast information, for example.

The air conditioner B1 is controlled based on a detection result from at least one of the temperature sensors 101 and 102. The state of the operation of the air conditioner B1 affects not only change in temperature, but also change in humidity in the agricultural house A1. Therefore, the controller 500 determines whether to identify the humidity sensors 301 and 302 as the target sensors based on the state of the operation of the air conditioner B1. The temperature of the air is an example of a first environmental indicator. The humidity is an example of a second environmental indicator. The air conditioner B1 is an example of a regulator.

The window opening and closing device D1 is controlled based on the detection result from at least one of the sensors, the sensors consisting of the rain sensor 201, the rain sensor 202, the humidity sensor 301, and the humidity sensor 302. The state of the operation of the window opening and closing device D1 affects not only change in humidity, but also change in temperature in the agricultural house A1. Therefore, the controller 500 determines whether to identify the temperature sensors 101 and 102 as the target sensors based on the state of the operation of the window opening and closing device D1. The humidity is another example of the first environmental indicator. The temperature is another example of the second environmental indicator. The window opening and closing device D1 is another example of the regulator.

The controller 500 includes a processor 510 and a storage device 520.

The storage device 520 is a recording medium readable by the processor 510. The storage device 520 includes, for example, a nonvolatile memory and a volatile memory. The nonvolatile memory is, for example, a read only memory (ROM), an erasable programmable read only memory (EPROM), and an electrically erasable programmable read only memory (EEPROM). The volatile memories is, for example, a random access memory (RAM). The storage device 520 stores a program.

The processor 510 includes, for example, one or more processors. For example, the processor 510 includes one or more central processing units (CPUs). Some or all of the functions of the processor 510 may be implemented by a circuit such as a digital signal processor (DSP), an application specific integrated circuit (ASIC), a programmable logic device (PLD), a field programmable gate array (FPGA), etc.

The processor 510 reads the program from the storage device 520. The processor 510 executes the program to realize a determiner 511, an identifier 512, a transmission instructor 513, and an operation controller 514.

The determiner 511 is configured to determine, for each indicator of a plurality of indicators consisting of the temperature of the air, the rain information, and the humidity, whether a relevant event, which is an event relevant to a change in the respective indicator, has occurred.

For example, the determiner 511 determines whether a temperature relevant event has occurred that is an event relevant to change in the temperature of the air.

The temperature relevant event includes an event in which "the door E1 opens." The event in which "the door E1 opens" tends to cause change in the temperature of the air.

The temperature relevant event includes an event in which "the window C1 opens" in addition to the event in which "the door E1 opens." The event in which "the window C1 opens" tends to cause change in the temperature of the air, as well as the event in which "the door E1 opens."

The temperature relevant event further includes an event in which "the weather forecast information indicates change in the temperature of the air." The event in which "the weather forecast information indicates change in the temperature of the air" is highly relevant to change in the temperature of the air.

Each of the event in which "the door E1 opens," the event in which "the window C1 opens," and the event in which "the weather forecast information indicates change in the temperature of the air" is an example of the temperature relevant event.

The temperature relevant event may include at least one of the events, the events consisting of the event in which "the door E1 opens," the event in which "the window C1 opens," and the event in which "the weather forecast information indicates change in the temperature of the air." For example, the temperature relevant event may include the event in which "the door E1 opens," the event in which "the window C1 opens," or the event in which "the weather forecast information indicates change in the temperature of the air." The temperature relevant event may include the event in which "the door E1 opens," the event in which "the window C1 opens," and the event in which "the weather forecast information indicates change in the temperature of the air." The temperature relevant event may include two events of three events including the event in which "the door E1 opens," the event in which "the window C1 opens," and the event in which "the weather forecast information indicates change in the temperature of the air."

The temperature relevant event may include an event different from any of the events, the events consisting of the event in which "the door E1 opens," the event in which "the window C1 opens," and the event in which "the weather forecast information indicates change in the temperature of the air."

The temperature relevant event is an example of the first event.

The determiner 511 determines whether the event in which "the door E1 opens" has occurred based on the image data.

The determiner 511 determines whether the event in which "the window C1 opens" has occurred based on the state of the operation of the window opening and closing device D1.

The determiner 511 determines whether the event in which "the weather forecast information indicates change in the temperature of the air" has occurred based on the weather forecast information.

The determiner 511 determines whether a rain relevant event has occurred that is an event relevant to change in the rain information.

The rain relevant event is an event in which "the weather forecast information indicates a forecast for rain." The event in which "the weather forecast information indicates a forecast for rain" is highly relevant to change in the rain information.

The rain relevant event may include an event different from the event in which "the weather forecast information indicates a forecast for rain." The rain relevant event may include an event different from the event in which "the weather forecast information indicates a forecast for rain" without including the event in which "the weather forecast information indicates a forecast for rain."

The determiner 511 determines whether a rain relevant event has occurred based on the weather forecast information. The rain relevant event is an example of a second event.

The determiner 511 determines whether a humidity relevant event has occurred that is an event relevant to change in humidity.

The humidity relevant event is an event in which "the weather forecast information indicates a forecast for rain." The event in which "the weather forecast information indicates a forecast for rain" is highly relevant to change in humidity.

The humidity relevant event includes the event in which "the door E1 opens" in addition to "the weather forecast information indicates a forecast for rain." The event in which "the door E1 opens" tends to cause change in humidity.

The humidity relevant event further includes an event in which "the air conditioner B1 operates." The event in which "the air conditioner B1 operates" tends to cause change in humidity.

Each of the event in which "the weather forecast information indicates a forecast for rain," the event in which "the door E1 opens," and the event in which "the air conditioner B1 operates" is an example of the humidity relevant event.

The humidity relevant event may include at least one of the events, the events consisting of the event in which "the weather forecast information indicates a forecast for rain," the event in which "the door E1 opens," and the event in which "the air conditioner B1 operates." For example, the humidity relevant event may include the event in which "the weather forecast information indicates a forecast for rain," the event in which "the door E1 opens," or the event in which "the air conditioner B1 operates." The humidity relevant event may include the event in which "the weather forecast information indicates a forecast for rain," the event in which "the door E1 opens," and the event in which "the air conditioner B1 operates." The humidity relevant event may include two events of three events including the event in which "the weather forecast information indicates a forecast for rain," the event in which "the door E1 opens," and the event in which "the air conditioner B1 operates."

The humidity relevant event may include an event different from any of the events, the events consisting of the event in which "the weather forecast information indicates a forecast for rain," the event in which "the door E1 opens," and the event in which "the air conditioner B1 operates."

The determiner 511 determines whether a humidity relevant event has occurred based on the weather forecast information, the image data indicative of the state of whether the door E1 is open, and the state of the operation of the air conditioner B1.

The humidity relevant event is an example of a third event.

The determiner 511 may be configured by a determination circuit having the same function as the determiner 511.

The identifier 512 is configured to identify a plurality of target sensors from among sensors consisting of the temperature sensor 101, the temperature sensor 102, the rain sensor 201, the rain sensor 202, the humidity sensor 301, and the humidity sensor 302, based on a result of a determination executed by the determiner 511.

Each of the temperature sensor 101, the temperature sensor 102, the rain sensor 201, the rain sensor 202, the humidity sensor 301, and the humidity sensor 302 is an example of respective sensor configured to detect one indicator of the plurality of indicators. Therefore, the identifier 512 identifies the plurality of target sensors from among a plurality of sensors constituted by respective sensors that are each configured to detect one indicator of the plurality of indicators, based on the result of the determination executed by the determiner 511.

The number of target sensors is less than the number of sensors included in the plurality of sensors. At least one target sensor of the plurality of target sensors is a sensor configured to detect an indicator corresponding to a relevant event that has occurred.

The identifier 512 may be configured by an identifying circuit having the same function as the identifier 512.

The transmission instructor 513 is configured to instruct each target sensor through the gateway 400 to transmit a respective detection result. The transmission instructor 513 may be configured by an instruction circuit having the same function as the transmission instructor 513.

The operation controller 514 receives, through the gateway 400, the respective detection result from each of the temperature sensors 101 and 102, the respective detection result from each of the rain sensors 201 and 202, and the respective detection result from each of the humidity sensors 301 and 302.

The operation controller 514 controls the air conditioner B1 based on the respective detection result from each of the temperature sensors 101 and 102.

The operation controller 514 controls the window opening and closing device D1 based on the respective detection result from each of the rain sensors 201 and 202, and based on the respective detection result from each of the humidity sensors 301 and 302.

The operation controller 514 may comprise one or more operation controllers having the same function as the operation controller 514, or an operation control circuit having the same function as the operation controller 514.

A2: Description of Operation

Figure 2:
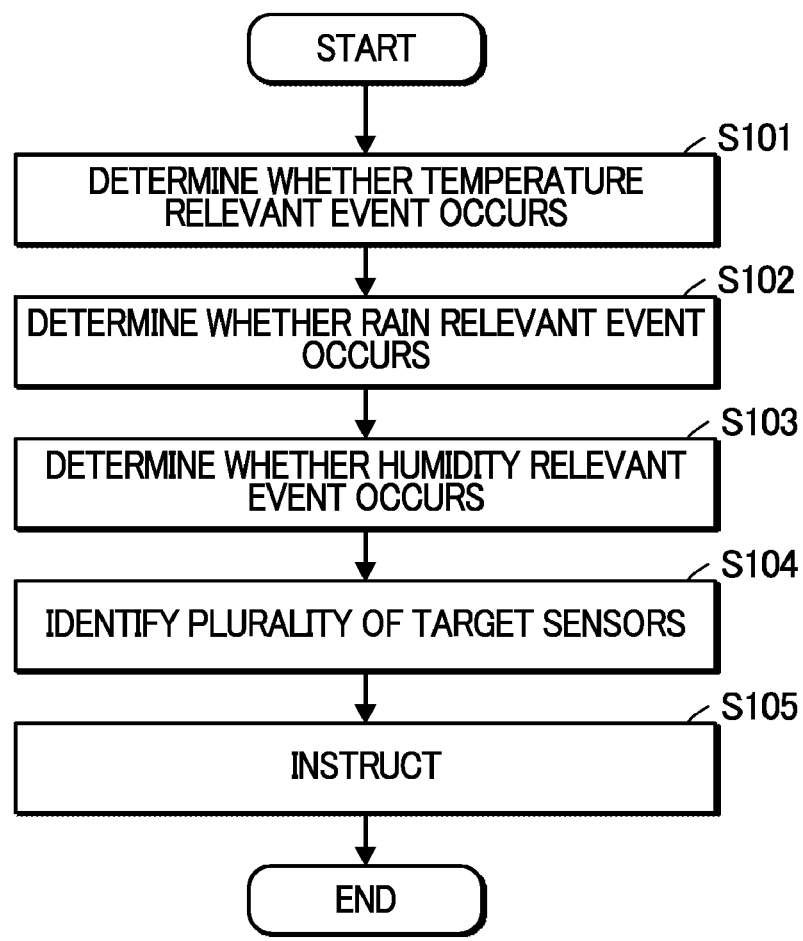
FIG. 2 is a flow chart depicting an operation of the environmental management system 1000.

FIG. 2 is a flowchart showing an operation of the environmental management system 1000. The environmental management system 1000 repeats the operation shown in FIG. 2.

In step S101, the determiner 511 determines whether the temperature relevant event has occurred.

For example, the determiner 511 first acquires the image data from the camera F1. Subsequently, the determiner 511 determines whether the image data indicates the event in which "the door E1 opens." Based on the image data indicative of the event in which "the door E1 opens," the determiner 511 determines that the temperature relevant event has occurred.

Based on the state of operation of the window opening and closing device D1, the determiner 511 determines whether the window C1 is opened due to the operation of the window opening and closing device D1. Based on the window C1 being opened due to the operation of the window opening and closing device D1, the determiner 511 determines that the event in which "the window C1 opens," in other words, a temperature relevant event, has occurred.

The determiner 511 acquires the weather forecast information from the weather forecast server 600. Subsequently, the determiner 511 determines whether the event in which "the weather forecast information indicates change in the temperature of the air" has occurred. Based on the event in which the weather forecast information indicates change in the temperature of the air occurring, the determiner 511 determines that a temperature relevant event has occurred.

Based on the weather forecast information not indicating change in the temperature of the air in a situation in which the window C1 is closed due to the operation of the window opening and closing device D1 while the image data does not indicate the event in which "the door E1 opens," the determiner 511 determines that no temperature relevant event has occurred.

Subsequently, in step S102, the determiner 511 determines whether a rain relevant event has occurred.

For example, the determiner 511 determines whether a rain relevant event has occurred in which "the weather forecast information indicates a forecast for rain."

Based on the weather forecast information indicating a forecast for rain, the determiner 511 determines that a rain relevant event has occurred. Based on the weather forecast information not indicating a forecast for rain, the determiner 511 determines that no rain relevant event has occurred.

Subsequently, in step S103, the determiner 511 determines whether a humidity relevant event has occurred.

For example, the determiner 511 determines whether a humidity relevant event has occurred in which "the weather forecast information indicates a forecast for rain." Based on the weather forecast information indicating a forecast for rain, the determiner 511 determines that a humidity relevant event has occurred.

The determiner 511 determines whether the image data indicates the event in which "the door E1 opens." Based on the image data indicating the event in which "the door E1 opens," the determiner 511 determines that a humidity relevant event has occurred.

The determiner 511 determines, based on the state of the operation of the air conditioner B1, whether the air conditioner B1 is operating. Based on the air conditioner B1 being in operation, the determiner 511 determines that a humidity relevant event has occurred.

Based on the air conditioner B1 not being in operation in a situation in which the weather forecast information does not indicate a forecast for rain while the image data does not indicate "the door E1 opens," the determiner 511 determines that no humidity relevant event has occurred.

Subsequently, in step S104, the identifier 512 identifies the plurality of target sensors from among the sensors consisting of the temperature sensor 101, the temperature sensor 102, the rain sensor 201, the rain sensor 202, the humidity sensor 301, and the humidity sensor 302, based on the result of the determination executed by the determiner 511.

For example, the identifier 512 identifies the plurality of target sensors by using a determination table 520a shown in FIG. 3. In the determination table 520a, the symbol "○" means an occurrence of a relevant event, and the symbol "×" means no occurrence of a relevant event.

For example, when neither a rain relevant event nor a humidity relevant event has occurred in a situation in which a temperature relevant event has occurred, the identifier 512 identifies, based on the determination table 520a, the temperature sensors 101 and 102 as the plurality of target sensors.

The temperature of the air and the humidity each have a greater effect on growth of crops than the rain information, as described above. Therefore, the identifier 512 identifies the temperature sensor 101, the temperature sensor 102, the humidity sensor 301, and the humidity sensor 302, as the plurality of target sensors, more preferentially than the rain sensors 201 and 202.

For example, when a temperature relevant event, a rain relevant event, and a humidity relevant event has occurred, the identifier 512 identifies the temperature sensor 101, the temperature sensor 102, the humidity sensor 301, and the humidity sensor 302 as the plurality of target sensors, without identifying the rain sensors 201 and 202 as the target sensors.

The identifier 512 may identify the target sensors based on a program without using the determination table 520a, as described above.

Subsequently, in step S105, the transmission instructor 513 instructs each target sensor through the gateway 400 to transmit the respective detection result.

The respective target sensor executes the detection in response to the instruction to transmit the respective detection result. The respective target sensor transmits the respective detection result to the gateway 400 wirelessly.

The operation controller 514 receives the respective detection results from the respective target sensors via the gateway 400. The operation controller 514 controls both the air conditioner B1 and the window opening and closing device D1 based on the respective detection results from the respective target sensors.

For example, when at least one of the temperature sensors 101 and 102 detects a temperature that is higher than an upper limit of a predetermined temperature range for growing crops, the operation controller 514 causes the air conditioner B1 to execute an operation to lower the temperature in the agricultural house A1.

When at least one of the temperature sensors 101 and 102 detects a temperature that is below a lower limit of the temperature range for growing crops, the operation controller 514 causes the air conditioner B1 to execute an operation to increase the temperature in the agricultural house A1.

When at least one of the humidity sensors 301 and 302 detects a humidity that is higher than an upper limit of a predetermined humidity range for growing crops, the operation controller 514 causes the window opening and closing device D1 to execute an operation to open the window C1.

When at least one of the humidity sensors 301 and 302 detects a humidity that is higher than the upper limit of the humidity range for growing crops in a situation in which the window C1 is open, the operation controller 514 does not operate the window opening and closing device D1.

When at least one of the humidity sensors 301 and 302 detects a humidity that is below a lower limit of the humidity range for growing crops, the operation controller 514 causes the window opening and closing device D1 to execute an operation to close the window C1.

When at least one of the humidity sensors 301 and 302 detects a humidity that is below the lower limit of the humidity range for growing crops in a situation in which the window C1 is closed, the operation controller 514 does not operate the window opening and closing device D1.

When at least one of the rain sensors 201 and 202 detects rain information indicative of a state in which it is raining, the operation controller 514 causes the window opening and closing device D1 to execute an operation to close the window C1 regardless of the detection results from the humidity sensors 301 and 302.

A3: Summary of First Embodiment

According to the first embodiment, it is possible to prevent the temperature sensor 101, the temperature sensor 102, the rain sensor 201, the rain sensor 202, the humidity sensor 301, and the humidity sensor 302 from transmitting the respective detection results simultaneously. Therefore, it is possible to reduce collisions between the detection results compared to a configuration in which the temperature sensor 101, the temperature sensor 102, the rain sensor 201, the rain sensor 202, the humidity sensor 301, and the humidity sensor 302 transmit respective detection results simultaneously B: Modifications The following are examples of modifications of the embodiment described above. Two or more modifications freely selected from the following modifications may be combined as long as no conflict arises from such combination.

B1: First Modification

The identifier 512 may determine, based on a communication capability of the gateway 400, a maximum allowable number of target sensors. In this case, the identifier 512 sets the number of target sensors to a number not greater than the maximum allowable number.

For example, the identifier 512 may determine the maximum allowable number of target sensors based on a period of time required for communication between the gateway 400 and the respective target sensors and based on the number of communication channels available to the gateway 400.

For example, the following situation is assumed. The environmental management system 1000 includes 150 temperature sensors, 100 rain sensors, and 120 humidity sensors. The communication between the gateway 400 and the respective target sensors requires two seconds (one second for each of an upstream communication and a downstream communication). To avoid collisions, the gateway 400 refrains from communication for one second. The number of communication channels available to the gateway 400 is "eight."

In this situation, the gateway 400 is capable of collecting detection results from at most 160 sensors per minute. Therefore, the identifier 512 determines "160" as the maximum allowable number of target sensors.

Based on the determination of the maximum allowable number of target sensors, the identifier 512 determines candidates for the target sensors.

Based on an occurrence of a temperature relevant event, the identifier 512 determines the 150 temperature sensors as candidates for the target sensors.

Based on an occurrence of a rain relevant event, the identifier 512 determines the 100 rain sensors as candidates for the target sensor.

Based on an occurrence of a humidity relevant event, the identifier 512 determines the 120 humidity sensors as candidates for the target sensors.

Therefore, when a temperature relevant event, a rain relevant event, and a humidity relevant event have occurred, the identifier 512 determines the 150 temperature sensors, the 100 rain sensors, and the 120 humidity sensors as candidates for the target sensors. In this case, 370 candidates for the target sensors are determined.

Based on the number of candidates for the target sensors (for example, 370) being greater than the maximum allowable number of target sensors (for example, 160), the identifier 512 reduces the number of candidates for the target sensors to a number less than or equal to the maximum allowable number of target sensors.

For example, by using one or more predetermined selection conditions, the identifier 512 reduces the number of candidates for the target sensors to a number less than or equal to the maximum allowable number of target sensors. In the following, an example will be described in which the identifier 512 uses four selection conditions including a first selection condition to a fourth selection condition.

First, the identifier 512 uses the first selection condition in which a sensor, which is configured to detect an indicator having a relatively large impact on growth of crops among the multiple indicators, should be a preferential sensor.

When the 150 temperature sensors, the 100 rain sensors, and the 120 humidity sensors are the candidates for the target sensors, the identifier 512 uses the first selection condition to reduce the candidates for the target sensors to the 150 temperature sensors and the 120 humidity sensors.

Based on the number of candidates for the target sensors reduced by using the first selection condition being greater than the maximum allowable number of target sensors, the identifier 512 uses the second selection condition in which a sensor, which is configured to detect an indicator having a relatively long time for regulation among the multiple indicators, should be a preferential sensor.

For example, it is assumed that a temperature regulation time required for the air conditioner B1 to regulate the temperature of the air (indicator) by a first predetermined value is longer than a humidity regulation time required for the window opening and closing device D1 to open the window C1 to regulate the humidity (indicator) by a second predetermined value. In this case, the identifier 512 reduces the candidates for the target sensors from the 150 temperature sensors and the 120 humidity sensors to the 150 temperature sensors.

Based on the temperature regulation time being equal to the humidity regulation time, the identifier 512 maintains the 150 temperature sensors and the 120 humidity sensors as the candidates for the target sensors.

The storage device 520 stores, in advance, regulation time information indicative of both the temperature regulation time and the humidity regulation time. The identifier 512 reads the regulation time information from the storage device 520 to recognize the temperature regulation time and the humidity regulation time.

Based on the number of candidates for the target sensors reduced by using the second selection condition being greater than the maximum allowable number of target sensors, the identifier 512 uses the third selection condition in which a sensor, for which a longer period of time has elapsed since the last detection result was collected, should be a preferential sensor.

The identifier 512 preferentially keeps sensors, which have a relatively long period of time that has elapsed since the last detection result was collected, from among the candidates for the target sensors reduced by using the second selection condition, as candidates for the target sensors.

When the number of sensors, which have the longest elapsed period of time, from among the target sensors reduced by using the second selection condition is greater than the maximum allowable number of target sensors, the identifier 512 uses the fourth selection condition in which a sensor, which is in a space in which an environmental change is expected, should be a preferential sensor.

The space in which the environmental change is expected is, for example, a space around the window C1 and a space around the door E1 in a space in the agricultural house A1.

The space around the window C1 is, for example, a space within a distance of two meters from the window C1. The distance of two meters may be changed as needed.

The space around the door E1 is, for example, a space within a distance of three meters from the door E1. The distance of three meters may be changed as needed.

Based on the number of candidates for the target sensors reduced by using the third selection condition being greater than the maximum allowable number of target sensors, the identifier 512 keeps sensors, which are in the space in which the environmental change is expected, from among the candidates for the target sensors, as candidates for the target sensors.

Based on the number of candidates for the target sensors reduced by using the fourth selection condition being greater than the maximum allowable number of target sensors, the identifier 512 keeps sensors, which are selected at random from among the candidates for the target sensors until the number of selected sensors is equal to the maximum allowable number, as candidates for the target sensors.

The identifier 512 identifies the candidates for the target sensors as the target sensors, the number of candidates for the target sensors being less than or equal to the maximum allowable number.

The number of temperature sensors, the number of rain sensors, the number of humidity sensors, the time for the communication between the gateway 400 and the respective target sensors, the during in which the gateway 400 refrains from communication, and the number of communication channels available to the gateway 400 are each not limited to the examples described above, and may be changed as needed.

According to the first modification, the identifier 512 limits the number of target sensors based on the communication capability of the gateway 400. Therefore, it is possible to reduce an occurrence of communication exceeding the communication capability of the gateway 400, thereby resulting in reducing a decline in quality of communication.

B2: Second Modification

The transmission instructor 513 may determine a timing of transmitting the respective detection result based on a stage of growth of crops. In this case, the transmission instructor 513 notifies the plurality of target sensors of the timing of the transmission.

The stage of growth of crops includes both a stage in which the environment, in which the crops are grown, needs to be controlled very frequently and a stage in which the environment, in which the crops are grown, does not need to be controlled very frequently. For example, at a stage in which crops germinate, the environment in which the crops are grown needs to be controlled very frequently. However, at a stage in which the crops have grown to a certain degree, the environment in which the crops are grown does not need to be controlled very frequently.

The transmission instructor 513 determines a first interval shorter than a second interval. The first interval is an interval of a transmission timing at the stage in which the environment, in which crops are grown, needs to be controlled very frequently. The second interval is an interval of a transmission timing at the stage in which the environment, in which crops are grown, does not need to be controlled very frequently. Therefore, the operation controller 514 is capable of controlling the environment, in which crops are grown, at an appropriate timing based on the detection results from the sensors.

The transmission instructor 513 determines the stage of growth of crops based on, for example, the image data generated by the camera configured to capture the crops.

A season for seed germination and a season for harvesting are approximately fixed depending on the type of crop. In other words, the stage of growth of crops depends on time of year. Therefore, the transmission instructor 513 may determine the stage of growth of crops based on time of year.

The transmission instructor 513 may use a transmission cycle as the transmission timing.

The transmission timing may be used as a timing of the detection executed by the sensor, or the transmission timing may be used as a cycle of the detection executed by the sensor.

According to the second modification, the transmission instructor 513 determines the transmission timing of the respective detection result based on the stage of growth of crops. Therefore, the controller 500 is capable of controlling the environment, in which crops are grown, at an appropriate timing, based on the detection results of the sensors.

B3: Third Modification

The transmission instructor 513 may determine, for each target sensor, a respective timing of transmitting a subsequent detection result based on a difference between a current detection result from the respective target sensor and a previous detection result the respective target sensor. In this case, the transmission instructor 513 notifies each target sensor of the respective timing of transmitting the subsequent detection result corresponding to the respective target sensor.

For example, for each target sensor, the transmission instructor 513 determines the respective timing of transmitting the subsequent detection result based on a relationship between a threshold value and the difference between the current detection result from the respective target sensor and the previous detection result from the respective target sensor.

The difference between the current detection result and the previous detection result is referred to as a "difference between the detection results." A period of time from the timing of transmitting the previous detection result to the timing of transmitting the current detection result is referred to as a "first period." A period of time from the timing of transmitting the current detection result to the timing of transmitting the subsequent detection result is referred to as a "second period."

When the difference between the detection results is greater than the threshold value, the change in the indicator to be detected is large. To keep the indicator within a range suitable for the environment in which the crops are grown, the indicator needs to be detected frequently, and the operation controller 514 needs to control the air conditioner B1 or the window opening and closing device D1 frequently in accordance with the change in the indicator. Therefore, when the difference between the detection results is greater than the threshold value, the transmission instructor 513 determines a transmission timing causing the second period shorter than the first period, as the timing of transmitting the subsequent detection result.

The transmission instructor 513 may determine, for each target sensor, a stability level of the indicator detected by the respective target sensor based on a change in the difference between the detection results.

For example, the transmission instructor 513 determines the stability level of the indicator based on the number of times that the difference between the detection results exceeds a threshold value during a first determination period that is a period for determining the stability level of the indicator. For example, the transmission instructor 513 calculates, as the stability level, a reciprocal of the number of times that the difference between the detection results exceeds the threshold value during the first determination period.

The transmission instructor 513 may determine the transmission timing based on the stability level. For example, the transmission instructor 513 increases the second period as the stability level increases. The transmission instructor 513 may increase the second period in steps as the stability level increases. The transmission instructor 513 may reduce the second period in steps as the stability level decreases.

According to the third modification, the transmission instructor 513 determines the timing of transmitting the subsequent detection result based on the difference between the detection results. This makes it easy to keep the indicators within the range suitable for the environment in which the crops are grown.

B4: Fourth Modification

The transmission instructor 513 may determine, for each target sensor, the respective timing of transmitting the subsequent detection result based on a change in the detection result from the respective target sensor during a predetermined period of time. In this case, the transmission instructor 513 notifies each target sensor of the respective timing of transmitting the subsequent detection result corresponding to the respective target sensor.

For example, the transmission instructor 513 determines the transmission timing based on whether the change in the detection result during the predetermined period of time is outside an allowable range.

When the change in the detection result during the predetermined period of time is outside the allowable range, the transmission instructor 513 sets a period of time shorter than a specified period of time as the second period. When the change in the detection result during the predetermined period of time is within the allowable range, the transmission instructor 513 sets a period of time longer than or equal to the specified period of time as the second period. The predetermined period of time is, for example, a period of time from 0:00 AM to 11:59 PM. The predetermined period of time is not limited to the time period described above, and the predetermined period of time may be changed as needed.

According to the fourth modification, the transmission instructor 513 determines the timing of transmitting the subsequent detection result based on the change in the detection result from the target sensor during the predetermined period of time. Therefore, the transmission timing can be determined in accordance with the change in the indicator during the predetermined period of time.

B5: Fifth Modification

A concentration of $CO_2$ may be used as one indicator of the plurality of indicators.

Figure 4:
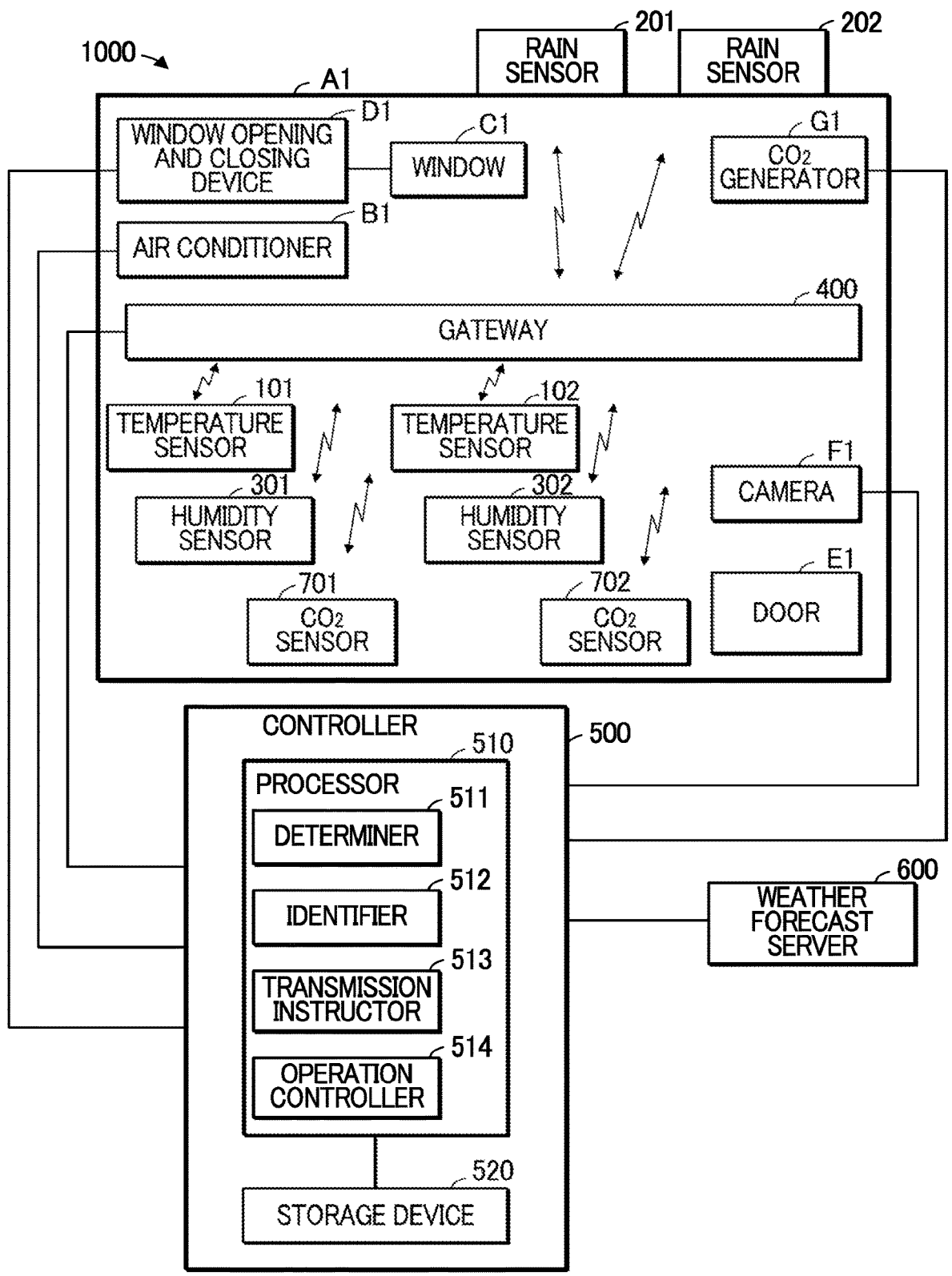
FIG. 4 is a diagram showing a fifth modification.

In a case in which the concentration of $CO_2$ is used as one indicator of the plurality of indicators, as shown in FIG. 4, the group of sensors further includes $CO_2$ sensors 701 and 702 that are each configured to detect the concentration of $CO_2$ in the agricultural house A1. The group of sensors may further include one, three, or more $CO_2$ sensors instead of the two $CO_2$ sensors.

In the case in which the concentration of $CO_2$ is used as one indicator of the plurality of indicators, the agricultural house A1 may preferably include a $CO_2$ generator G1 configured to regulate the concentration of $CO_2$ in the agricultural house A1.

Change in the concentration of $CO_2$ in the agricultural house A1 tends to be caused by the event in which "the door E1 opens." The change in the concentration of $CO_2$ in the agricultural house A1 tends to be caused by the event in which "the window C1 opens." Therefore, each of the event in which "the door E1 opens" and the event in which "the window C1 opens" is an example of a $CO_2$ concentration relevant event that is an event relevant to change in concentration of $CO_2$.

The determiner 511 further determines whether the $CO_2$ concentration relevant event has occurred. The identifier 512 identifies the plurality of target sensors based on the result of the determination executed by the determiner 511. Based on the determiner 511 determining that a $CO_2$ concentration relevant event has occurred, the identifier 512 may identify the $CO_2$ sensors 701 and 702 as target sensors.

In a case in which the group of target sensors includes the $CO_2$ sensors 701 and 702, the transmission instructor 513 instructs each of the $CO_2$ sensors 701 and 702 via the gateway 400 to transmit the respective detection result.

In response to the instruction to transmit the respective detection result, the $CO_2$ sensors 701 and 702 each detect the concentration of $CO_2$ in the agricultural house A1. The $CO_2$ sensors 701 and 702 each transmit the respective detection result of the concentration of $CO_2$ in the agricultural house A1 to the gateway 400.

In response to receiving the respective detection results of the concentration of $CO_2$ in the agricultural house A1, the gateway 400 transmits the respective detection results of the concentration of $CO_2$ in the agricultural house A1 to the controller 500.

The operation controller 514 in the controller 500 controls the $CO_2$ generator G1 based on the respective detection results of the concentration of $CO_2$ in the agricultural house A1. For example, based on the respective detection results of the concentration of $CO_2$ in the agricultural house A1 indicating a concentration of $CO_2$ that is below a reference concentration, the operation controller 514 causes the $CO_2$ generator G1 to generate $CO_2$.

According to the fifth modification, the controller 500 is capable of regulating the concentration of $CO_2$ in the agricultural house A1 while reducing collisions between detection results.

B6: Sixth Modification

In a case in which the agricultural house A1 includes a portion through which light passes, an amount of solar radiation may be used as one indicator of the plurality of indicators.

Figure 5:
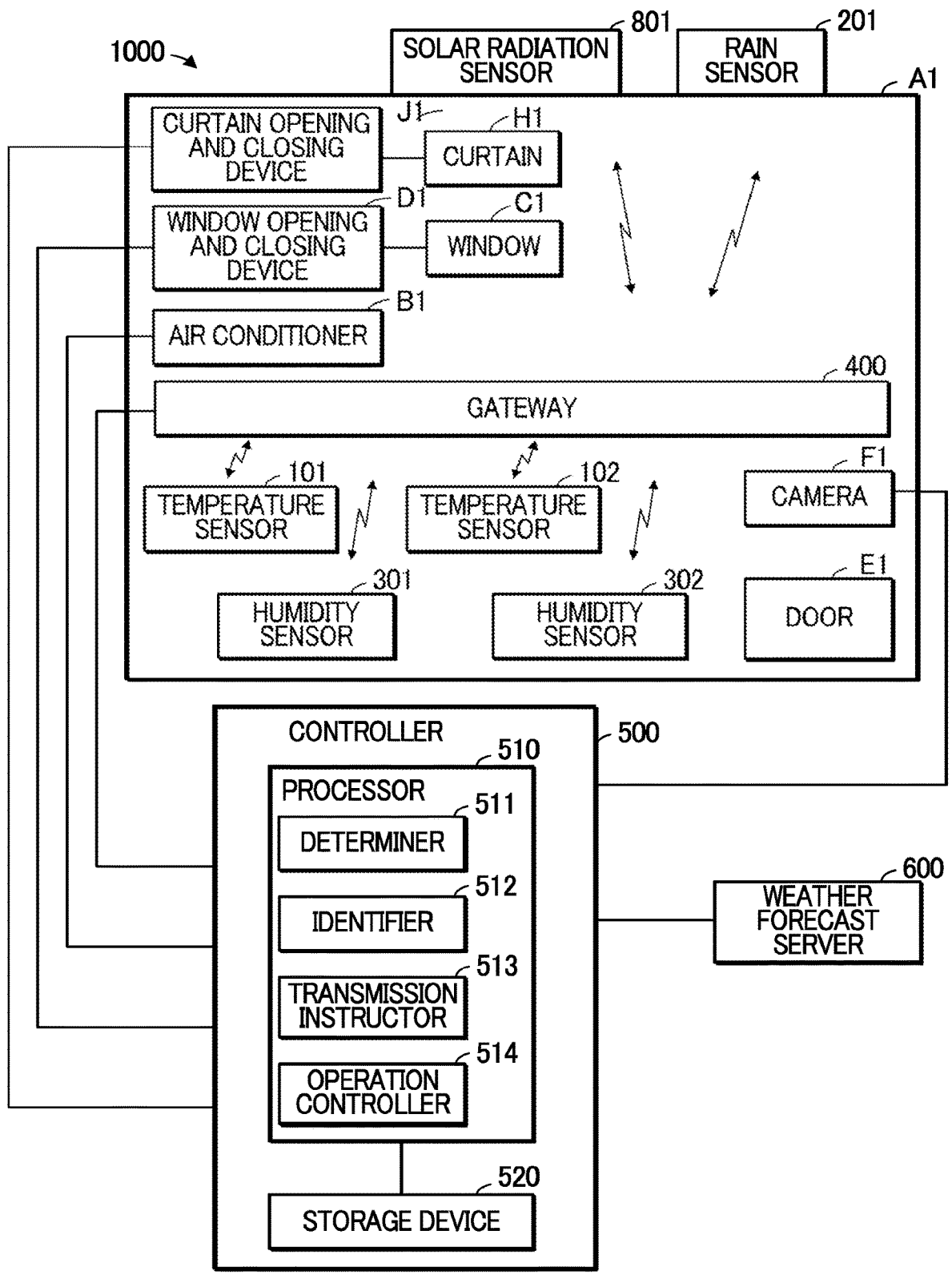
FIG. 5 is a diagram showing a sixth modification.

In a case in which the amount of solar radiation is used as one indicator of the plurality of indicators, as shown in FIG. 5, the group of sensors further includes a solar radiation sensor 801 configured to detect the amount of solar radiation. The group of sensors may further include two or more solar radiation sensors instead of one solar radiation sensor.

In a case in which the amount of solar radiation is used as one indicator of the plurality of indicators, the agricultural house A1 is equipped with a curtain H1 for regulating the amount of solar radiation into the agricultural house A1 and a curtain opening and closing device J1 for opening and closing the curtain H1. The curtain H1 is capable of covering a portion of the agricultural house A1, the portion of the agricultural house A1 being a portion through which light passes. The curtain opening and closing device J1 includes an actuator configured to open and close the curtain H1.

Change in the amount of solar radiation is highly relevant to an event in which "the weather forecast information indicates change in the weather." The event in which "the weather forecast information indicates change in the weather" is an example of a solar-radiation-amount relevant event that is an event relevant to change in amount of solar radiation.

The determiner 511 further determines whether a solar-radiation-amount relevant event has occurred. The identifier 512 identifies the plurality of target sensors based on the result of the determination executed by the determiner 511. Based on the determiner 511 determining that a solar-radiation-amount relevant event has occurred, the identifier 512 may determine the solar radiation sensor 801 as the target sensor.

In a case in which the group of target sensors includes the solar radiation sensor 801, the transmission instructor 513 instructs the solar radiation sensor 801, via the gateway 400, to transmit the detection result.

In response to the instruction to transmit the detection result, the solar radiation sensor 801 detects the amount of solar radiation. The solar radiation sensor 801 transmits the detection result of the amount of solar radiation to the gateway 400.

In response to receiving the detection result of the amount of solar radiation, the gateway 400 transmits the detection result of the amount of solar radiation to the controller 500.

The operation controller 514 in the controller 500 controls the curtain opening and closing device J1 based on the detection result of the amount of solar radiation. For example, based on the detection result of the amount of solar radiation indicating an amount of solar radiation greater than a reference amount of solar radiation, the operation controller 514 causes the curtain opening and closing device J1 to close the curtain H1. Based on the detection result of the amount of solar radiation indicating an amount of solar radiation less than the reference amount of solar radiation, the operation controller 514 causes the curtain opening and closing device J1 to open the curtain H1.

An event in which "the curtain opening and closing device J1 opens the curtain H1" and an event in which "the curtain opening and closing device J1 closes the curtain H1" each tend to cause change in the temperature of the air. The event in which "the curtain opening and closing device J1 opens the curtain H1" and the event in which "the curtain opening and closing device J1 closes the curtain H1" each belong to an example of the temperature relevant event.

The determiner 511 may further determine whether an event has occurred in which "the curtain opening and closing device J1 opens the curtain H1." The determiner 511 may further determine whether an event has occurred in which "the curtain opening and closing device J1 closes the curtain H1."

Based on the determiner 511 determining that the event has occurred in which "the curtain opening and closing device J1 opens the curtain H1," the identifier 512 may determine the temperature sensors 101 and 102 as the target sensors. Based on the determiner 511 determining that the event has occurred in which "the curtain opening and closing device J1 closes the curtain H1," the identifier 512 may determine the temperature sensors 101 and 102 as the target sensors.

According to the sixth modification, the controller 500 is capable of regulating the amount of solar radiation entering into the agricultural house A1 while reducing collisions between the detection results.

B7: Seventh Modification

A temperature of soil in the agricultural house A1 (hereinafter referred to as a "soil temperature") may be used as one indicator of the plurality of indicators, the soil in the agricultural house A1 being soil in which crops are planted.

Figure 6:
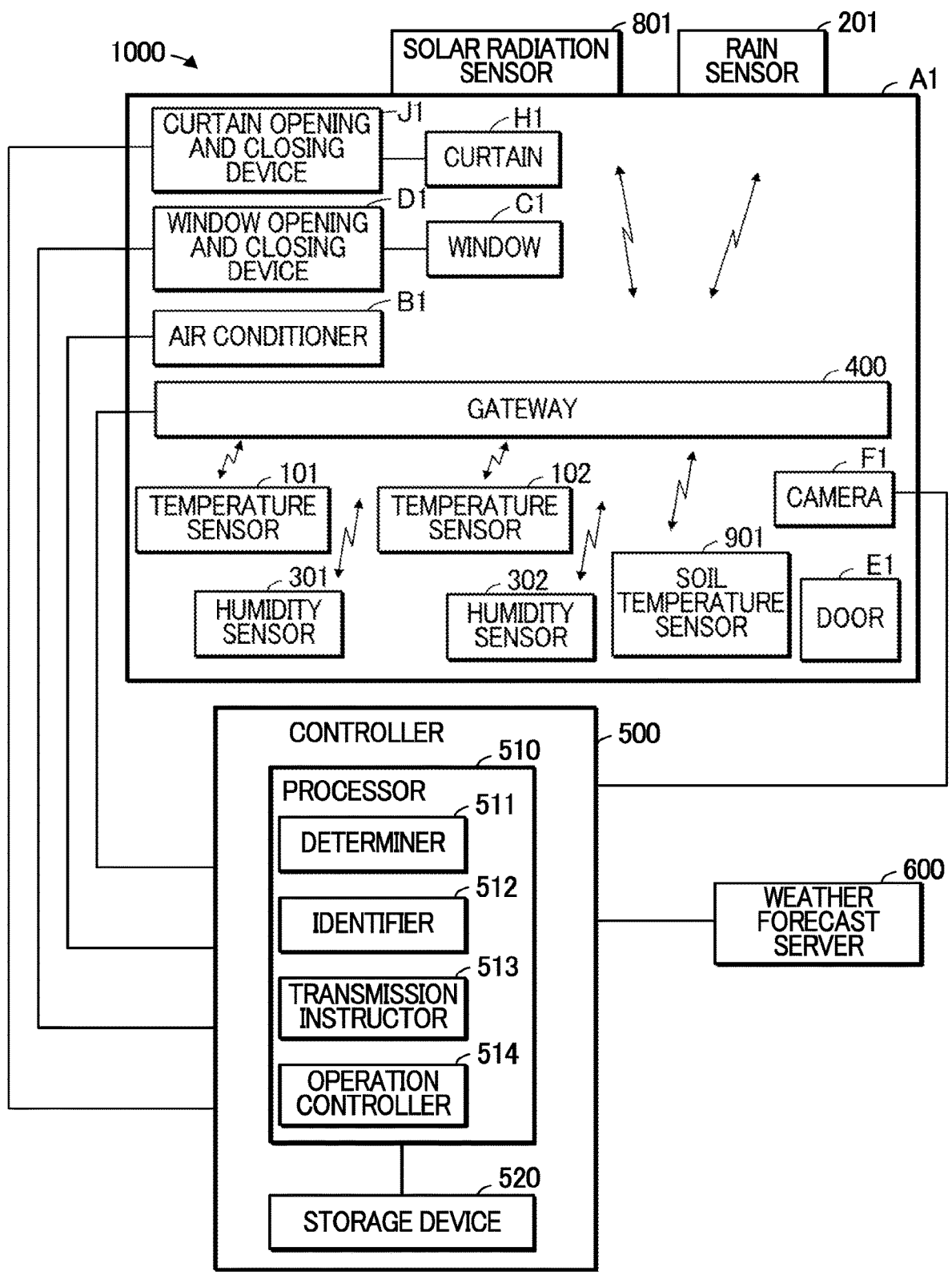
FIG. 6 is a diagram showing a seventh modification.

In a case in which the soil temperature is used as one indicator of the plurality of indicators, as shown in FIG. 6, the group of sensors further includes a soil temperature sensor 901 configured to detect the soil temperature. The group of sensors may include two or more soil temperature sensors instead of one soil temperature sensor.

Change in the soil temperature tends to be caused by each of an event in which "the air conditioner B1 operates," an event in which "the curtain opening and closing device J1 opens the curtain H1," and an event in which "the curtain opening and closing device J1 closes the curtain H1." Each of the event in which "the air conditioner B1 operates," the event in which "the curtain opening and closing device J1 opens the curtain H1," and the event in which "the curtain opening and closing device J1 closes the curtain H1," is an example of a soil temperature relevant event that is an event relevant to change in soil temperature.

The determiner 511 further determines whether a soil temperature relevant event has occurred. The identifier 512 identifies the plurality of target sensors based on the result of the determination executed by the determiner 511. Based on the determiner 511 determining that a soil temperature relevant event has occurred, the identifier 512 may determine the soil temperature sensor 901 as the target sensor.

In a case in which the group of target sensors includes the soil temperature sensor 901, the transmission instructor 513 instructs the soil temperature sensor 901 via the gateway 400 to transmit the detection result.

In response to the instruction to transmit the detection result, the soil temperature sensor 901 detects the soil temperature. The soil temperature sensor 901 transmits the detection result of the soil temperature to the gateway 400.

In response to receiving the detection result of the soil temperature, the gateway 400 transmits the detection result of the soil temperature to the controller 500.

The operation controller 514 in the controller 500 controls the air conditioner B1 based on the detection result of the soil temperature.

For example, based on the detection result of the soil temperature indicative of a soil temperature that is higher than an upper limit of a reference soil temperature range, the operation controller 514 causes the air conditioner B1 to execute an operation to lower the soil temperature.

In a situation in which either of the temperature sensors 101 and 102 detects a temperature of the air that is below the lower limit of the temperature range for growing crops, based on the detection result of the soil temperature indicative of a soil temperature that is higher than the upper limit of the reference soil temperature range, the operation controller 514 may cause the air conditioner B1 to execute an operation to increase the temperature in the agricultural house A1.

Based on the detection result of a soil temperature indicative of a soil temperature that is below a lower limit of the reference soil temperature range, the operation controller 514 causes the air conditioner B1 to execute an operation to increase the soil temperature.

In a situation in which either of the temperature sensors 101 and 102 detects the temperature of the air that is higher than the upper limit of the temperature range for growing crops, based on the detection result of the soil temperature indicative of a soil temperature that is below the lower limit of the reference soil temperature range, the operation controller 514 may cause the air conditioner B1 to execute an operation to decrease the temperature in the agricultural house A1.

According to the seventh modification, the controller 500 is capable of regulating the soil temperature in the agricultural house A1 while reducing conflicts between the detection results.

B8: Eighth Modification

Figure 7:
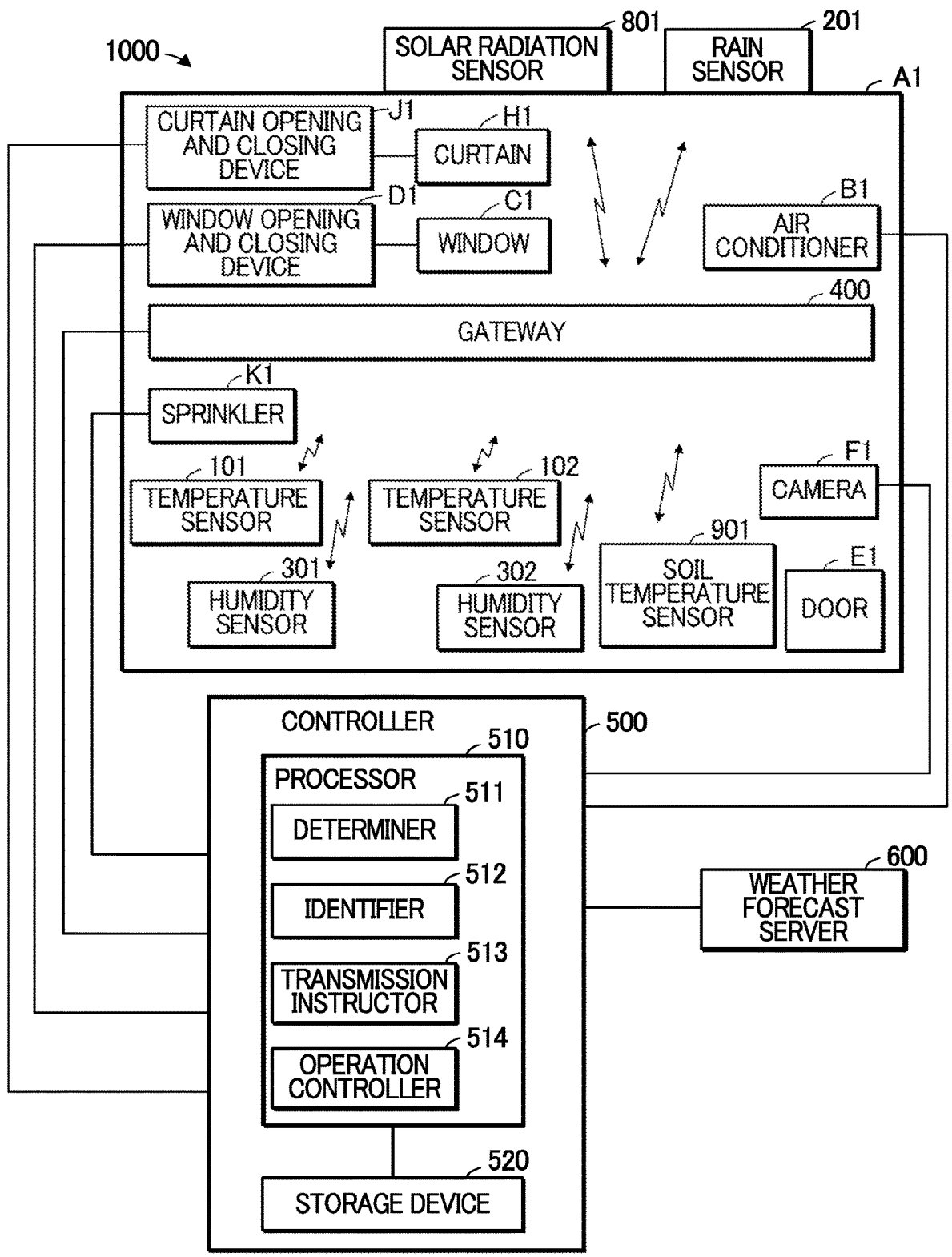
FIG. 7 is a diagram showing an eighth modification.

The agricultural house A1 may be equipped with a sprinkler K1 as shown in FIG. 7. The sprinkler K1 is used to regulate the humidity in the agricultural house A1.

Based on at least one of the humidity sensors 301 and 302 detecting a humidity that is below the lower limit of the humidity range for growing crops, the operation controller 514 controls to cause the sprinkler K1 to sprinkle water.

An event in which "the sprinkler K1 sprinkles water" tends to cause both change in the temperature of the air and change in the soil temperature. An event in which "the sprinkler K1 sprinkles water" is not only an example of a temperature relevant event, but also an example of a soil temperature relevant event.

The determiner 511 may further determine whether the event in which "the sprinkler K1 sprinkles water" has occurred.

Based on the determiner 511 determining that the event in which "the sprinkler K1 sprinkles water" has occurred, the identifier 512 may determine the temperature sensor 101, the temperature sensor 102, and the soil temperature sensor 901 as the target sensors.

According to the eighth modification, the controller 500 is capable of controlling the humidity in the agricultural house A1 with greater accuracy than a configuration without the sprinkler K1, while reducing collisions between the detection results.

B9: Ninth modification

The sensors included in the group of sensors are not limited to the sensors described above, as long as they detect an indicator related to the environment in which crops are grown.

The devices configured to regulate the environment in which the crops are grown are not limited to the air conditioner B1, the window opening and closing device D1, the curtain opener J1, and the sprinkler K1.

C: Other Matters (1) In each of the first embodiment and the first through the ninth modifications, the storage device 520 may include flexible disks, magneto-optical disks (e.g., compact disks, digital multi-purpose disks, Blu-ray (registered trademark) discs, smart-cards, flash memory devices (e.g., cards, sticks, key drives), Compact Disc-ROMs (CD-ROMs), registers, removable discs, hard disks, floppy (registered trademark) disks, magnetic stripes, databases, servers, or other suitable storage mediums. The program may be transmitted from a network via telecommunication lines.

(2) Each of the first embodiment and the first through the ninth modifications may be applicable to at least one of systems using Long Tenn Evolution (LTE), LTE-advanced (LTE-A), SUPER 3G, IMT-Advanced, 4th generation mobile communication system (4G), 5th generation mobile communication system (5G), future radio access (FRA), W-CDMA (registered trademark), GSM (registered trademark), CDMA2000, ultra mobile broadband (UMB), IEEE 802.11 (Wi-Fi), IEEE 802.16 (WiMAX (registered trademark)), IEEE 802.20, Ultra-wideband (UWB), Bluetooth (registered trademark), LoRa (registered trademark) and other appropriate systems, and/or next-generation systems extended based on the system.

(3) The information, etc., described in each of the first embodiment and the first through the ninth modifications may be presented by use of various techniques. For example, data, information, etc., which may be referred to throughout the above description, may be represented by voltages, currents, electromagnetic waves, magnetic fields, magnetic particles, light fields, photons, or any combination thereof.

It should be noted that the terms described in this specification and/or terms necessary for understanding this specification may be replaced by terms having the same or similar meanings.

(4) In each of the first embodiment and the first through the ninth modifications, input and/or output information, etc., may be stored in a specific location (e.g., memory) or may be managed by use of a management table. The information, etc., that is input and/or output may be overwritten, updated, or appended. The information, etc., that is output may be deleted. The information, etc., that is input may be transmitted to other devices.

(5) In each of the first embodiment and the first through the ninth modifications, determination may be made based on values that can be represented by one bit (0 or 1), may be made based on Boolean values (true or false), or may be made based on comparing numerical values (for example, comparison with a predetermined value).

(6) The order of processes, sequences, flowcharts, etc., that have been used to describe the first embodiment and the first through ninth modifications may be changed as long as they do not conflict. For example, although a variety of methods has been illustrated in this disclosure with a variety of elements of steps in exemplary orders, the specific orders presented herein are by no means limiting.

(7) Each function illustrated in FIGS. 1 and 4 through 7 is implemented by any combination of hardware and software. Each function may be implemented by a single device, or may be implemented by two or more separate devices.

(8) The programs illustrated in each of the first embodiment and the first through the ninth modifications should be widely interpreted as an instruction, an instruction set, a code, a code segment, a program code, a subprogram, a software module, an application, a software application, a software package, a routine, a subroutine, an object, an executable file, an execution thread, a procedure, a function, or the like, regardless of whether it is called software, firmware, middleware, microcode, hardware description language, or other names.

Software, instructions, etc., may be transmitted and received via a transmission medium. For example, when the software is transmitted from a website, a server, or other remote sources using wired technology, such as a coaxial cable, fiber optic cable, twisted pair cable, or digital subscriber line (DSL), and/or wireless technology, such as infrared, wireless, or microwave technology, these wired and/or wireless technologies are included within the definition of the transmission medium.

(9) In each of the first embodiment and the first through the ninth modifications, the terms "system" and "network" are used interchangeably.

(10) In each of the first embodiment and the first through the ninth modifications, the controller 500 may be a mobile station. Those skilled in the art may refer to a mobile station as a subscriber station, mobile unit, subscriber unit, wireless unit, remote unit, mobile device, wireless device, wireless communicator, remote device, mobile subscriber station, access terminal, mobile terminal, wireless terminal, remote terminal, handset, user agent, mobile client, client, or other appropriate terms.

(11) In each of the first embodiment and the first through the ninth modifications, the phrase "based on" as used in this specification does not mean "based only on", unless specified otherwise. In other words, the phrase "based on" means both "based only on" and "based at least on."

(12) Any reference to an element using the designations "first", and "second", etc., used herein does not generally limit the quantity or order of these elements. These designations may be used herein as a convenient way of distinguishing between two or more elements. Accordingly, references to the first and second elements do not mean that only two elements may be employed therein, or that the first element must precede the second element in any way.

(13) As long as terms such as "include", "comprise" and modifications of these are used in each of the first embodiment and the first through ninth modifications, these terms are intended to be inclusive, in a manner similar to the way the term "provide" is used. In addition, the term "or" used in the specification or in claims is not intended to be an exclusive OR.

(14) In the disclosure, for example, when articles such as "a", "an", and "the" in English are added in translation, these articles include plurals unless otherwise clearly indicated by the context.

(15) The term "device" in this specification may be understood as another term such as a circuit, a device or a unit, etc.

(16) It is obvious to those skilled in the art that the present invention is not limited to the embodiments described in the specification. The present invention can be implemented in modified and altered modes without departing from the spirit and scope of the present invention defined in accordance with the claims. Consequently, the description in this specification is provided only for the purpose of explaining examples and should by no means be construed to limit the present invention in any way. In addition, a plurality of modes selected from the modes illustrated the specification may be used in combination.

D: Aspects Derivable from the Embodiment and the Modifications Described Above

The following configurations are derivable from at least one of the embodiment and the modifications described above.

D1: First Aspect

A control apparatus according to a first aspect includes a determiner configured to determine, for each indicator of a plurality of indicators, whether an event relevant to a change in the respective indicator has occurred, the plurality of indicators relating to an environment in which crops are grown, each indicator of the plurality of indicators being detected by one or more sensors of a plurality of sensors; an identifier configured to identify, based on a result of a determination executed by the determiner, a plurality of target sensors from among the plurality of sensors, a number of target sensors being less than a number of sensors included in the plurality of sensors; and a transmission instructor configured to instruct each target sensor of the plurality of target sensors to transmit a respective detection result. According to this aspect, it is possible to reduce collisions of a detection result transmitted from one sensor with a detection result transmitted from another sensor.

D2: Second Aspect

In an example (second aspect) of the first aspect, the plurality of indicators includes a first indicator and a second indicator, the first indicator relating to the environment, the second indicator relating to the environment, the first indicator has a greater effect on growth of crops than the second indicator, the identifier is configured to identify, as the plurality of target sensors, sensors configured to detect the first indicator more preferentially than sensors configured to detect the second indicator from among the plurality of sensors based on the determiner determining that both a first event relevant to a change in the first indicator and a second event relevant to a change in the second indicator has occurred or based on the determiner determining that an event relevant to both a change in the first indicator and a change in the second indicator has occurred. The event relevant to both the change in the first indicator and the change in the second indicator is, for example, a rain relevant event in which "weather forecast information indicates a forecast for rain," in this case, an example of the first indicator is "humidity," and an example of the second indicator is "rain information." According to this aspect, it is possible to identify a sensor configured to detect an indicator with great effect on growth of crops as a target sensor.

D3: Third Aspect

In an example (third aspect) of the first aspect, the determiner is configured to, as a determination of whether an event relevant to a change in one indicator of the plurality of indicators has occurred and as a determination of whether an event relevant to a change in at least one indicator of the plurality of indicator has occurred, determine whether an event relevant to both the change in the one indicator and the change in the at least one indicator has occurred, the at least one indicator of the plurality of indicator differing from the one indicator. An example of the predetermined relevant event is the rain relevant event in which "weather forecast information indicates a forecast for rain," in this case, an example of the one indicator is "humidity," and an example of the at least one indicator is "rain information." According to this aspect, the number of events required for the determination can be substantially reduced. Therefore, the determination executed by the determiner is easy.

D4: Fourth Aspect

In an example (fourth aspect) of the first aspect, the plurality of indicators includes a first indicator relating to the environment, and the determiner is configured to receive event data relating to occurrence of a first event relevant to a change in the first indicator to determine, based on the event data, whether the first event has occurred. According to this aspect, it is possible to determine whether the first event has occurred based on the event data.

D5: Fifth Aspect

In an example (fifth aspect) of the first aspect, the plurality of indicators includes a first environmental indicator and a second environmental indicator, the first environmental indicator relating to the environment, the second environmental indicator relating to the environment, and the determiner is configured to determine, based on a state of operation of a regulator, whether an event relevant to a change in the second environmental indicator has occurred, the regulator being configured to regulate the first environmental indicator, the regulator being configured to change the second environmental indicator in accordance with regulating the first environmental indicator. An example of the first environmental indicator is humidity, and an example of the second environmental indicator is temperature. An example of the regulator is a window opening and closing device. According to this aspect, it is possible to determine, based on a state of an operation of the regulator, whether an event relevant to a change in the second environmental indicator has occurred.

D6: Sixth Aspect

In an example (sixth aspect) of any one of the first to the fifth aspects, the identifier is configured to determine a maximum allowable number of target sensors based on a communication capability of a communicator to set the number of target sensors to a number not greater than the maximum allowable number, the communicator being configured to receive the respective detection result from each target sensor. According to this aspect, it is possible to adjust the number of target sensors based on the communication capability of the communicator.

D7: Seventh Aspect

In an example (seventh aspect) of any one of the first to the sixth aspects, the transmission instructor is configured to determine a timing of transmitting the detection result based on a stage of growth of the crops to notify the plurality of target sensors of the timing of transmitting the detection result. According to this aspect, it is possible to adjust the frequency of acquiring indicators in accordance with a stage of growth of crops.

D8: Eighth Aspect

In an example (eighth aspect) of any one of the first to the sixth aspects, the transmission instructor is configured to determine, for each target sensor, a respective timing of transmitting a subsequent detection result based on a difference between a current detection result and a previous detection result to notify each target sensor of the respective timing of transmitting the subsequent detection result corresponding to the respective target sensor. According to this aspect, it is possible to determine a respective timing of transmitting a subsequent detection result based on the magnitude of a difference between a current detection result and a previous detection result.

D9: Ninth Aspect

In an example (ninth aspect) of the eighth aspect, the transmission instructor is configured to determine, for each target sensor, the respective timing of transmitting the subsequent detection result based on a relationship between the difference and a threshold value. According to this aspect, it is possible to determine the respective timing of transmitting the subsequent detection result based on a relationship between the difference and a threshold value.

D10: Tenth Aspect

In an example (eighth aspect) of any one of the first to the sixth aspects, the transmission instructor is configured to determine, for each target sensor, a respective timing of transmitting a subsequent detection result based on a change in the detection result to notify each target sensor of the respective timing of transmitting the subsequent detection result corresponding to the respective target sensor. According to this aspect, it is possible to determine the respective timing of transmitting the subsequent detection result based on a change in the detection result.

DESCRIPTION OF REFERENCE SIGNS

101, 102 . . . temperature sensor, 201, 202 . . . rain sensor, 301, 303 . . . humidity sensor, 400 . . . gateway, 500 . . . controller, 510 . . . processor, 511 . . . determiner, 512 . . . identifier, 513 . . . transmission instructor, 514 . . . operation controller, 520 . . . storage device, 520a . . . determination table, 600 . . . weather forecast server, 701, 702 . . . $CO_2$ sensor, 801 . . . solar radiation sensor, 901 . . . soil temperature sensor, 1000 . . . environmental management system, A1 . . . agricultural house, B1 . . . air conditioner, C1 . . . window, D1 . . . window opening and closing device, E1 . . . door, F1 . . . camera, G1 . . . $CO_2$ generator, H1 . . . curtain, J1 . . . curtain opening and closing device, K1 . . . sprinkler.

The invention claimed is:

1. A control apparatus comprising:
processing circuitry configured to
determine, for each indicator of a plurality of indicators, whether an event relevant to a change in the respective indicator has occurred, the plurality of indicators relating to an environment in which crops are grown, each indicator of the plurality of indicators being detected by one or more sensors of a plurality of sensors;
identify, based on a result of the determination, a plurality of target sensors from among the plurality of sensors, a number of target sensors being less than a number of sensors included in the plurality of sensors; and
instruct each target sensor of the plurality of target sensors to transmit a respective detection result,
wherein the processing circuitry is further configured to
determine a maximum allowable number of target sensors based on a communication capability of a communicator to set the number of target sensors to a number not greater than the maximum allowable number, and
receive the respective detection result from each target sensor.

2. The control apparatus according to claim 1, wherein:
the plurality of indicators includes a first indicator and a second indicator, the first indicator relating to the environment, the second indicator relating to the environment,
the first indicator has a greater effect on growth of crops than the second indicator, and
the processing circuitry is configured to identify, as the plurality of target sensors, sensors configured to detect the first indicator more preferentially than sensors configured to detect the second indicator from among the plurality of sensors based on the processing circuitry determining that both a first event relevant to a change in the first indicator and a second event relevant to a change in the second indicator has occurred or based on the processing circuitry determining that an event relevant to both a change in the first indicator and a change in the second indicator has occurred.

3. The control apparatus according to claim 1, wherein the processing circuitry is configured to, as a determination of whether an event relevant to a change in one indicator of the plurality of indicators has occurred and as a determination of whether an event relevant to a change in at least one indicator of the plurality of indicator has occurred, determine whether an event relevant to both the change in the one indicator and the change in the at least one indicator has occurred, the at least one indicator of the plurality of indicator differing from the one indicator.

4. The control apparatus according to claim 1, wherein:
the plurality of indicators includes a first indicator relating to the environment, and
the processing circuitry is configured to receive event data relating to occurrence of a first event relevant to a change in the first indicator to determine, based on the event data, whether the first event has occurred.

5. The control apparatus according to claim 1, wherein:
the plurality of indicators includes a first environmental indicator and a second environmental indicator, the first environmental indicator relating to the environment, the second environmental indicator relating to the environment, and
the processing circuitry is configured to determine, based on a state of operation of a regulator, whether an event relevant to a change in the second environmental indicator has occurred, the regulator including circuitry being configured to regulate the first environmental indicator, the circuitry of the regulator being configured to change the second environmental indicator in accordance with regulating the first environmental indicator.

6. The control apparatus according to claim 1, wherein the processing circuitry is configured to determine a timing of transmitting the detection result based on a stage of growth of the crops to notify the plurality of target sensors of the timing of transmitting the detection result.

7. The control apparatus according to claim 1, wherein the processing circuitry is configured to determine, for each target sensor, a respective timing of transmitting a subsequent detection result based on a difference between a current detection result and a previous detection result to notify each target sensor of the respective timing of transmitting the subsequent detection result corresponding to the respective target sensor.

8. The control apparatus according to claim 7, wherein the processing circuitry is configured to determine, for each target sensor, the respective timing of transmitting the subsequent detection result based on a relationship between the difference and a threshold value.

9. The control apparatus according to claim 1, wherein the processing circuitry is configured to determine, for each target sensor, a respective timing of transmitting a subsequent detection result based on a change in the detection result to notify each target sensor of the respective timing of transmitting the subsequent detection result corresponding to the respective target sensor.

10. A control apparatus comprising:
processing circuitry configured to:
  determine, for each indicator of a plurality of indicators, whether an event relevant to a change in the respective indicator has occurred, the plurality of indicators relating to an environment in which crops are grown, each indicator of the plurality of indicators being detected by one or more sensors of a plurality of sensors;
  identify, based on a result of a determination executed by the processing circuitry, a plurality of target sensors from among the plurality of sensors, a number of target sensors being less than a number of sensors included in the plurality of sensors; and
  instruct each target sensor of the plurality of target sensors to transmit a respective detection result,
wherein the crops are grown in an agricultural house including a door,
wherein the plurality of indicators includes temperature of air in the agricultural house, and
wherein an event relevant to a change in the temperature is an event in which the door opens.

11. A control apparatus comprising:
processing circuitry configured to:
  determine, for each indicator of a plurality of indicators, whether an event relevant to a change in the respective indicator has occurred, the plurality of indicators relating to an environment in which crops are grown, each indicator of the plurality of indicators being detected by one or more sensors of a plurality of sensors;
  identify, based on a result of a determination executed by the processing circuitry, a plurality of target sensors from among the plurality of sensors, a number of target sensors being less than a number of sensors included in the plurality of sensors; and
  instruct each target sensor of the plurality of target sensors to transmit a respective detection result,
wherein the crops are grown in an agricultural house including a door,
wherein the plurality of indicators includes humidity in the agricultural house, and
wherein an event relevant to a change in the humidity is an event in which the door opens.

* * * * *